US005952731A

United States Patent [19]

[11] Patent Number: 5,952,731
[45] Date of Patent: Sep. 14, 1999

McPherson et al.

[54] MEMBRANE KEYLESS ENTRY SWITCH FOR VEHICLES

[75] Inventors: Will McPherson, Detroit; Rutunj Rai, Westland; Robert D. Muller, Royal Oak, all of Mich.

[73] Assignee: Lear Automotive Dearborn, Inc., Dearborn, Mich.

[21] Appl. No.: 09/017,282

[22] Filed: Feb. 2, 1998

[51] Int. Cl.[6] .................... B60R 25/00
[52] U.S. Cl. .................... 307/10.2; 180/287
[58] Field of Search .................... 307/10.1, 10.2; 200/5 A, 512, 513, 517, 313, 314, 341, 302.1, 302.2, 5 R; 174/152 G, 153 G; 180/287, 289; 70/237, 256, 257, 264

[56] References Cited

U.S. PATENT DOCUMENTS 3,928,736 12/1975 Drage .................... 200/5 A
4,022,993 5/1977 Shattuck .................... 200/5 A
4,636,593 1/1987 Novak et al. .................... 200/5 A
4,692,571 9/1987 Trinh et al. .................... 200/5 A
5,698,907 12/1997 Weber .................... 307/10.1
5,736,677 4/1998 Sato et al. .................... 174/152 G

*Primary Examiner*—Richard T. Elms
*Attorney, Agent, or Firm*—Brooks & Kushman P.C.

[57] ABSTRACT

An improved switch for entering a key code includes a plurality of moving contact members all molded together into a single membrane. Each of the moving contact members moves within a hole in a housing. The housing is connected to a base with a snap connection. A circuit board and the membrane are sandwiched between the base and housing. A sealing lip on the membrane is deformed against the housing to provide a water tight seal around the circumference of the housing. Wires extend from the circuit board through holes in the base, and grommets surround the wire sealing the holes. LED's are provided on the circuit board to backlight the moving contact members.

11 Claims, 2 Drawing Sheets

FIG. 1A
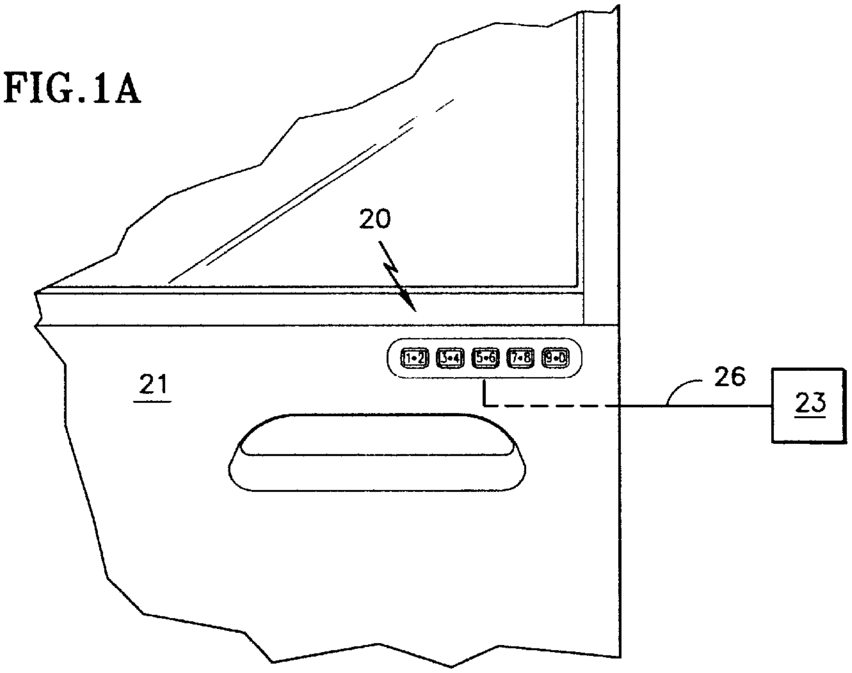
FIG. 1B
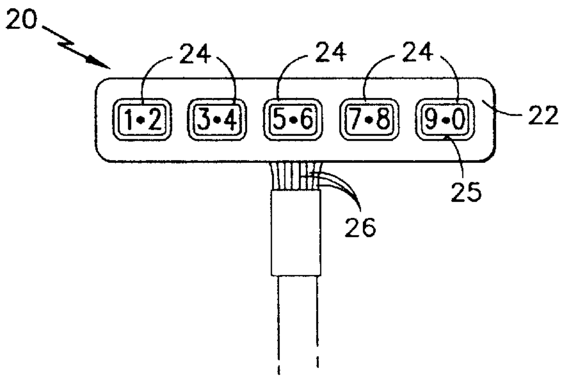
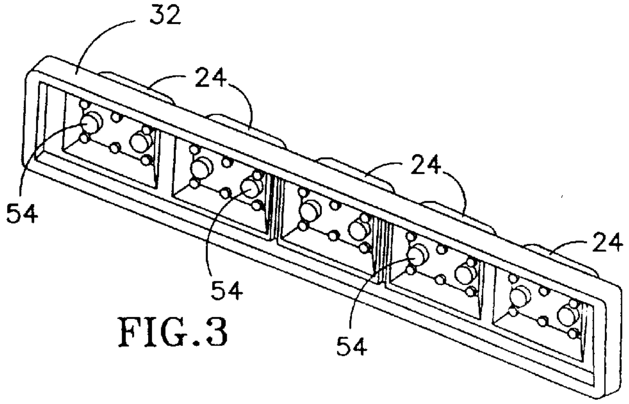
FIG. 3

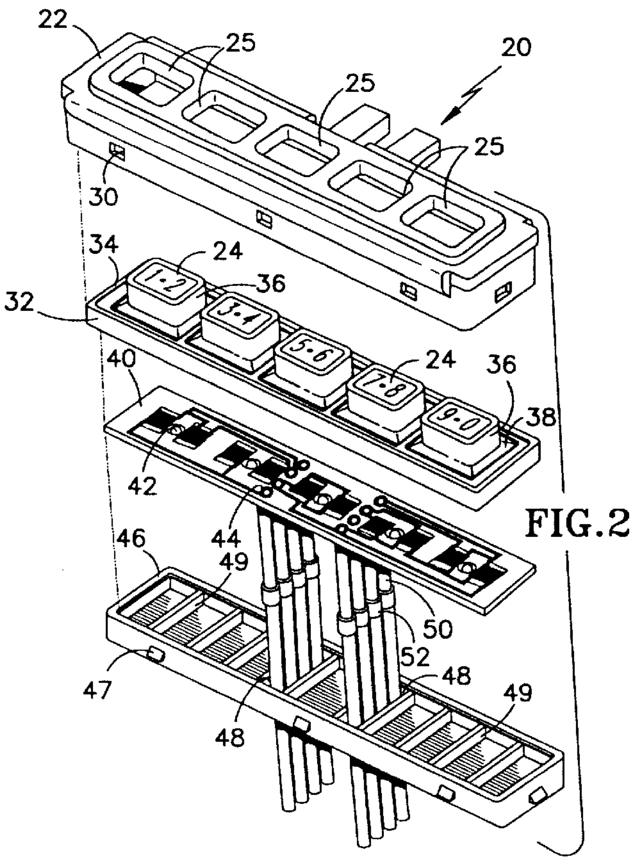
FIG.2
FIG.4
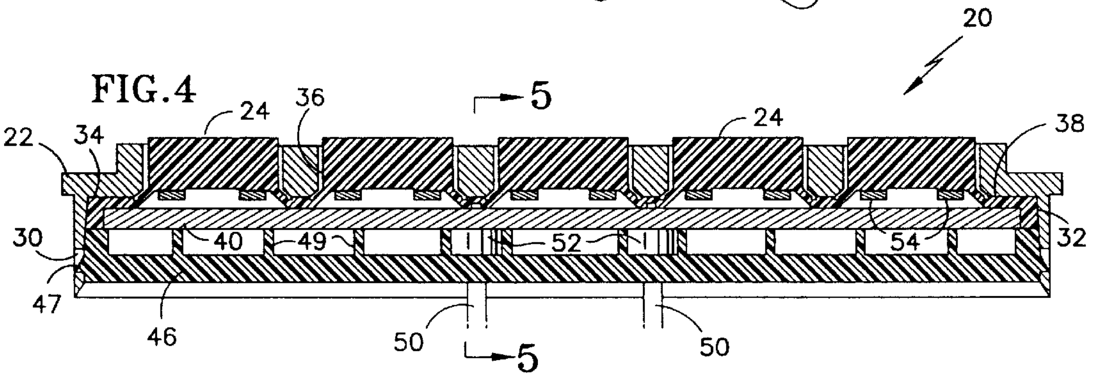
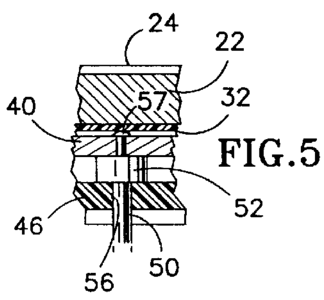
FIG.5

MEMBRANE KEYLESS ENTRY SWITCH FOR VEHICLES

BACKGROUND OF THE INVENTION

This invention relates to a membrane switch for use in a watertight keyless or code entry system for vehicles.

Modern vehicles are equipped with keyless entry systems one type is a code entry system mounted onto the door of the vehicle. Typically, the driver is provided with a code, and if the code numbers are properly entered on the switch, the door lock will open. The switches typically provide a number of buttons which may be actuated to properly enter the code.

In the prior art, these buttons are usually provided by standard mechanical switches for each of the buttons. Further, the numbers are backlit with electroluminescent displays or standard light bulbs. Light bulbs require a large amount of space and electroluminescent displays are relatively expensive.

In addition, these assemblies are placed on the door of the vehicle and exposed to the environment. Thus, they are subject to leaking.

It is an object of this invention to improve upon this type of keyless entry switch.

SUMMARY OF THE INVENTION

In the disclosed embodiment of this invention a membrane switch replaces the mechanical switches which were previously utilized for each of the several input buttons. The membrane switch is a one piece part that provided moveable contacts areas for each of the codes associated with these type switches. While any number of inputs can be utilized, in the preferred embodiment, five are utilized. Contacts are placed on the back of the membrane switch for each contact area and when the contact areas are depressed the contacts come into contact with circuit traces on a circuit board completing an electric circuit. In a preferred embodiment the contacts on the back of the membrane switch are gold.

The membrane switch is preferably sandwiched between a housing and a base. The housing and base preferably snap together. A circuit board is placed beneath the membrane switch and carries the circuit traces. Further, the circuit board is preferably provided with LED's which backlight each of the contact areas. Wires travel through the base and are connected to the circuit board to communicate signals from the circuit board to a controller for the door lock.

The wires are preferably surrounded by grommets which are positioned and sandwiched between the base, and circuit board. The grommets seal holes in the base through which the wire passes. The membrane is preferably provided with a sealing lip which abuts the interior of the housing to surround openings through which the contact areas of the membrane extends.

By sandwiching the membrane and circuit board between the housing and base, and by providing the sealing lip and grommet, the present invention provides a seal which is more water tight than prior systems.

These and other features of the present invention may be understood from the following specification and drawings, the following of which is a brief description.

BRIEF DESCRIPTION OF THE DRAWINGS

FIG. 1A shows a schematic view of a vehicle.

FIG. 1B shows an inventive keyless entry switch.

FIG. 2 is an exploded view of the FIG. 1 switch.

FIG. 3 is a back view of a membrane portion of the switch of this invention.

FIG. 4 is a cross-sectional view through the assembly of FIG. 1.

FIG. 5 is a cross-sectional view along line 5—5 as shown in FIG. 4.

DETAILED DESCRIPTION OF THE PREFERRED EMBODIMENT

FIG. 1A shows switch 20 in a vehicle door 21. Switch 20 communicates with a door lock control 23 through wires 26.

Keyless entry switch 20 is shown in FIG. 1B having a housing 22, and five contact areas 24 moveable within openings 25 in the housing 22. As will be explained below, the contact areas 24 are all integrally molded together into a single membrane member.

As shown in FIG. 2, housing 22 has its openings 25 and snap openings 30 in a side wall. The membrane 32 includes a sealing bead 34 surrounding the moving contact area 24. As shown, the contact areas 24 have side walls 36 extending downwardly to a base 38. The contact areas are molded to allow flexing movement inwardly and back outwardly of base 38.

A PC board 40 carries LED's 42 and circuit traces 44 for completing the various circuits when the contact areas 24 are depressed.

A base 46 includes snap in members 47 which snap into the openings 30. Openings 48 receive wires 50 connected to the circuit board 40. Ribs 49 are positioned to support the circuit board when the switch 20 is assembled. Grommets 52 are shown on the wire 50.

As shown in FIG. 3, membrane 32 has contacts 54 on a rear face. As shown, there are preferably a plurality of the contacts on the rear face. In a preferred embodiment there are four contacts for each contact area. In the preferred embodiment these contacts are formed of gold. The contacts are brought into contact with the circuit traces on the board 40 to complete a circuit and send a particular signal to the door lock control. In this way the control is able to communicate which button has been depressed by the operator. Membrane 32 may be molded on any suitable material.

As shown in FIG. 4, the housing 22 is shown assembled to the base 46. Ribs 49 support board 40. Contacts 54 extend downwardly from each contact area 24. As shown, the contacts are normally out of contact with the circuit traces on the board 40. When depressed, the contact areas 24 flex and contacts 54 come into contact with the circuit traces.

Base 46 and board 40 compress the membrane upwardly against the inner surface of the housing 22 such that the sealing bead 34 is deformed against the inner surface of the housing 22. Thus, a very good seal is provided around the circumference of the housing.

As shown in FIG. 5, the grommet 52 is sandwiched between the board 40 and the base 46. The grommet thus tightly seals the opening 56 through the base 46. As shown, the wire 50 is connected at 57 to the board 40.

The present invention thus provides a water tight assembly which is relatively low cost when compared to the prior art assemblies.

Although a preferred embodiment of this invention has been disclosed, a worker of ordinary skill in the art would recognize certain modifications would come within the scope of this invention. For that reason, the following claims should be studied to determine the true scope and content of this invention.

We claim:

1. A switch for providing input of a code comprising:

a plurality of moving members, each of said moving members having a contact on a first side, and said plurality of moving members being molded together as a one piece membrane;

a housing having openings and said moving members extending into said opening, a base fixed to said housing, and a circuit board captured between said base and said membrane; and said base having holes extending away from said board, a plurality of wires electrically connected to said board and extending through said holes, grommets surrounding said wires, and having an outer diameter greater than the inner diameter of said holes such that said grommets abut said base and provide a water tight seal at said holes.

2. A switch as recited in claim 1, wherein said membrane is provided with a sealing bead extending into contact with an inner surface of said housing, and said sealing bead being deformed against said housing when said switch is assembled.

3. A switch as recited in claim 2, wherein a surface of said base and a surface of said board deform said sealing bead into said housing.

4. A switch as recited in claim 1, wherein said contacts are formed of gold.

5. A switch as recited in claim 1, wherein an LED is provided to backlight each of said moving members.

6. A switch as recited in claim 1, wherein said base and said housing snap together.

7. A vehicle door lock and switch system comprising:

a vehicle door lock;

a door lock control;

a switch for inputting a code to said control, said switch including a plurality of moving members, each of said moving members having a contact on a first side, and said plurality of moving members being molded together as a one piece membrane, said membrane having a sealing lip surrounding said moving members;

a housing having openings and said moving contact members extending into said opening, a base fixed to said housing, and a circuit board captured between said base and said membrane, said sealing lip abutting said housing; and said base having holes extending away from said board, a plurality of wires electrically connected to said board and extending through said openings and to said control, grommets surrounding said wires, and having an outer diameter greater than the inner diameter of said holes such that said grommets abut said base and provide a water tight seal at said holes.

8. A system as set forth in claim 7, wherein said contacts are gold.

9. A system as set forth in claim 7, wherein LED's are provided to backlight each moving member.

10. A system as set forth in claim 7, wherein the membrane being provided with a sealing bead extending into contact with an inner surface of said housing, said sealing bead being deformed against said housing when said switch is assembled.

11. A system as set forth in claim 10, wherein a surface of said base and a surface of said board deform said sealing bead into said housing.

* * * * *